United States Patent
Tang et al.

(10) Patent No.: US 10,853,916 B2
(45) Date of Patent: Dec. 1, 2020

(54) CONVOLUTION DECONVOLUTION NEURAL NETWORK METHOD AND SYSTEM

(71) Applicant: SENSETIME GROUP LIMITED, Hong Kong (CN)

(72) Inventors: Xiaoou Tang, Hong Kong (CN); Chao Dong, Hong Kong (CN); Tak Wai Hui, Hong Kong (CN); Chen Change Loy, Hong Kong (CN)

(73) Assignee: SENSETIME GROUP LIMITED, Hong Kong (CN)

( * ) Notice: Subject to any disclaimer, the term of this patent is extended or adjusted under 35 U.S.C. 154(b) by 142 days.

(21) Appl. No.: 16/013,886

(22) Filed: Jun. 20, 2018

(65) Prior Publication Data

US 2018/0300855 A1 Oct. 18, 2018

Related U.S. Application Data (63) Continuation of application No. PCT/CN2015/098027, filed on Dec. 21, 2015.

(51) Int. Cl.
*G06T 3/40* (2006.01)
*G06N 3/04* (2006.01)

(52) U.S. Cl.
CPC .......... *G06T 3/4053* (2013.01); *G06T 3/4046* (2013.01); *G06N 3/04* (2013.01); *G06T 2207/20084* (2013.01)

(58) Field of Classification Search
CPC . G06T 2207/20081; G06T 2207/20084; G06T 3/4046; G06T 3/4053; G06N 3/04
See application file for complete search history.

(56) References Cited

U.S. PATENT DOCUMENTS

| | | | |
|---|---|---|---|
| 2011/0150354 A1 | 6/2011 | Huang | |
| 2012/0328213 A1 | 12/2012 | Yamamoto et al. | |
| 2017/0132758 A1* | 5/2017 | Paluri | G06K 9/00744 |
| 2018/0365824 A1* | 12/2018 | Yuh | G06T 7/0012 |
| 2019/0012768 A1* | 1/2019 | Tafazoli Bilandi | G06T 1/20 |

FOREIGN PATENT DOCUMENTS

| | | |
|---|---|---|
| CN | 102354394 A | 2/2012 |
| CN | 105046651 A | 11/2015 |

OTHER PUBLICATIONS

Han et al., "Learning Deconvolution Network for Semantic Segmentation", Computer Vision and Pattern Recognition (cs.CV) Sun, May 17, 2015. (Year: 2015).*

(Continued)

*Primary Examiner* — Kenny A Cese
(74) *Attorney, Agent, or Firm* — Reising Ethington P.C.

(57) ABSTRACT

A method and system for processing an image operates by: filtering a first real image to obtain a first feature map therefor with performances of image features improved; upscaling the obtained first feature map to improve a resolution thereof, the feature map with improved resolution forming a second feature map; and constructing, from the second feature map, a second real image having enhanced performances and a higher resolution than that of the first real image.

14 Claims, 5 Drawing Sheets

(56) References Cited

OTHER PUBLICATIONS

Han et al., "Learning Deconvolution Network for Semantic Segmentation", Computer Vision and Pattern Recognition (Year: 2015).*
International Search Report for International application No. PCT/CN2015/098027, dated Sep. 28, 2016, 2 pages.
Chao Dong et al., Learning a Deep Convolutional Network for Image Super-Resolution, Proceedings of European Conference on Computer Vision (ECCV), 2014.

* cited by examiner

S801 — FILTERING A FIRST REAL IMAGE TO OBTAIN A FIRST FEATURE MAP THEREFOR WITH PERFORMANCES OF IMAGE FEATURES IMPROVED

S802 — UPSCALING THE OBTAINED FIRST FEATURE MAP TO IMPROVE A RESOLUTION THEREOF, THE FEATURE MAP WITH IMPROVED RESOLUTION FORMING A SECOND FEATURE MAP

S803 — CONSTRUCTING, FROM THE SECOND FEATURE MAP, A SECOND REAL IMAGE HAVING ENHANCED PERFORMANCES AND A HIGHER RESOLUTION THAN THAT OF THE FIRST REAL IMAGE

CONVOLUTION DECONVOLUTION NEURAL NETWORK METHOD AND SYSTEM

CROSS REFERENCE TO RELATED APPLICATION

This application is a continuation of PCT/CN2015/098027, filed on Dec. 21, 2015 and entitled "A SYSTEM AND A METHOD FOR IMAGE PROCESSING", the entire disclosure of which is hereby incorporated by reference.

TECHNICAL FIELD

The disclosures relates to a method and a system for image processing.

BACKGROUND

One object of image processing is to recover a high-resolution image from a single or multiple low-resolution images. Such resolution-enhancing technology offers a promise of overcoming some of the inherent resolution limitations of low-cost imaging sensors (e.g., cell phone or surveillance cameras), and is also essential in medical imaging and satellite imaging where diagnosis or analysis from low-quality images may be extremely difficult. Furthermore, it is regarded as a key component for video Super-Resolution (SR), and can be used as a pre-preprocessing technique to facilitate other high-level computer vision algorithms (e.g., face recognition, image classification and object detection). The SR of a depth map is also essential in many applications, such as autonomous navigation, 3D reconstruction, human-computer interaction and virtual reality.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In an aspect, disclosed is a method for processing an image, comprising: filtering a first real image to obtain a first feature map therefor with performances of image features improved; upscaling the obtained first feature map to improve a resolution thereof, the feature map with improved resolution forming a second feature map; and constructing, from the second feature map, a second real image having enhanced performances and a higher resolution than that of the first real image.

In one embodiment of the disclosure, the method is implemented in a convolution-deconvolution neural network comprising: a first convolution layer configured for filtering the first real image to obtain the first feature map; a deconvolution layer coupled to the first convolution layer and upscaling the first feature map to form the second feature map; and a second convolution layer coupled to the deconvolution layer and constructing the second real image from the second feature map.

In one embodiment of the disclosure, the method further comprises training the convolution-deconvolution neural network by the following process: filtering, by the first convolution layer, the first image to improve the performances of the image features therefor; upscaling, by the deconvolution layer, the filtered image to improve the resolution thereof; aggregating, by the second convolution layer, the upscaled image to construct a test image; comparing the test image with an image selected from ground truth images, which is paired to the training image selected from a predetermined training set, to obtain a reconstruction error therebetween; and back-propagating iteratively the reconstruction error through the network to adjust weights on connections between neurons of the network until the reconstruction error is lower than a predetermined threshold.

In one embodiment of the disclosure, the training set is prepared by: blurring each of the ground truth images to cause the image features thereof smeared; down-sampling each of the blurred ground truth images to obtain a blurred and down-sampled training image with blurred image features and a reduced pixel density; and pairing each of the ground truth images with the blurred and down-sampled training image.

In one embodiment of the disclosure, the first convolution layer comprises: an extracting layer extracting the image feature of the first real image; a shrinking layer coupled to the extraction layer and reducing a feature dimension of the extracted feature; a mapping layer coupled to the shrinking layer and non-linearly mapping the extracted feature with the reduced feature dimension; and an expanding layer coupling the mapping layer with the deconvolution layer and expanding the feature dimension of the mapped feature to obtain the first feature map.

In one embodiment of the disclosure, the upscaling is performed by a deconvolution operation; while in another embodiment of the disclosure, the upscaling is performed by a plurality of convolution filters to mimic a function of a deconvolution filter for upscaling the first feature map to obtain the second feature map.

In another aspect, disclosed is a system for processing an image, comprising: a processor; and a memory storing instructions executable by the processor to perform operations, the operations comprising: filtering a first real image to obtain a first feature map therefor with performances of image features improved; upscaling the obtained first feature map to improve a resolution thereof, the feature map with improved resolution forming a second feature map; and constructing, from the second feature map, a second real image having enhanced performances and a higher resolution than that of the first real image.

In one embodiment of the disclosure, the system comprises a convolution-deconvolution neural network comprising: a first convolution layer for filtering the first real image to obtain the first feature map; a deconvolution layer coupled to the first convolution layer and upscaling the first feature map to form the second feature map; and a second convolution layer coupled to the deconvolution layer and constructing the second real image from the second feature map.

In one embodiment of the disclosure, the convolution-deconvolution neural network is trained by: filtering, by the first convolution layer of the neural network, the first image to improve the performances of the image features therefor; upscaling, by the deconvolution layer of the neural network, the filtered image to improve the resolution thereof; aggregating, by the second convolution layer of the neural network, the upscaled image to construct a test image; comparing, the test image with an image selected from ground truth images, which is paired to a training image selected from a predetermined training set, to obtain a reconstruction error therebetween; and back-propagating iteratively, the reconstruction error through the network to adjust weights on connections between neurons of the network until the error is lower than a predetermined threshold.

In one embodiment of the disclosure, the training set is prepared by blurring each of the ground truth images to cause the image features thereof smeared; down-sampling each of the blurred ground truth images to obtain a blurred and down-sampled training image with blurred image features and a reduced pixel density; and pairing each of the ground truth images with the blurred and down-sampled training image.

In one embodiment of the disclosure, the first convolution layer comprises: an extracting layer comprising a plurality of feature extractors extracting the image feature of the first real image; a shrinking layer coupled to the extraction layer and reducing a feature dimension of the extracted feature; a mapping layer coupled to the shrinking layer and non-linearly mapping the extracted feature with the reduced feature dimension; and an expanding layer coupling the mapping layer with the deconvolution layer and expanding the feature dimension of the mapped feature to obtain the first feature map.

In one embodiment of the disclosure, the upscaling is performed by a deconvolution operation.

In one embodiment of the disclosure, the upscaling is performed by a plurality of convolution filters to mimic a function of a deconvolution filter for upscaling the first feature map to obtain the second feature map.

In yet another aspect, disclosed is a non-transitory computer readable storage medium for storing computer readable instructions executable by a processor to perform operations, the operations comprising: filtering a first real image to obtain a first feature map therefor with performances of image features improved; upscaling the obtained first feature map to improve a resolution thereof, the feature map with improved resolution forming a second feature map; and constructing, from the second feature map, a second real image having enhanced performances and a higher resolution than that of the first real image.

In one embodiment of the disclosure, the operations are implemented in a convolution-deconvolution neural network comprising: a first convolution layer configured for filtering the first real image to obtain the first feature map; a deconvolution layer coupled to the first convolution layer and upscaling the first feature map to form the second feature map; and a second convolution layer coupled to the deconvolution layer and constructing the second real image from the second feature map.

In one embodiment of the disclosure, the operations further comprise: training the convolution-deconvolution neural network by: filtering, by the first convolution layer, the first real image to improve the performances of the image features therefor; upscaling, by the deconvolution layer, the filtered image to improve the resolution thereof; aggregating, by the second convolution layer, the upscaled image to construct a test image; comparing the test image with an image selected from ground truth images, which is paired to a training image selected from a predetermined training set, to obtain a reconstruction error therebetween; and back-propagating iteratively the reconstruction error through the network to adjust weights on connections between neurons of the network until the error is lower than a predetermined threshold.

In one embodiment of the disclosure, the training set is prepared by: blurring each of the ground truth images to cause the image features thereof smeared; down-sampling each of the blurred ground truth images to obtain a blurred and down-sampled training image with blurred image features and a reduced pixel density; and pairing each of the ground truth images with the blurred and down-sampled training image.

In one embodiment of the disclosure, the first convolution layer comprises: an extracting layer extracting the image feature of the first real image; a shrinking layer coupled to the extraction layer and reducing a feature dimension of the extracted feature; a mapping layer coupled to the shrinking layer and non-linearly mapping the extracted feature with the reduced feature dimension; and an expanding layer coupling the mapping layer with the deconvolution layer and expanding the feature dimension of the mapped feature to obtain the first feature map.

In one embodiment of the disclosure, the upscaling is performed by a deconvolution operation.

In one embodiment of the disclosure, the upscaling is performed by a plurality of convolution filters to mimic a function of a deconvolution filter for upscaling the first feature map to obtain the second feature map.

BRIEF DESCRIPTION OF THE DRAWING

Exemplary non-limiting embodiments of the disclosure are described below with reference to the attached drawings. The drawings are illustrative and generally not to an exact scale. The same or similar elements on different figures are referenced with the same reference numbers.

DETAILED DESCRIPTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be appreciated by one skilled in the art that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the disclosure. The technical solution presented by the disclosure may be practiced without some or all of these specific details. In other instances, well-known process operations have not been described in detail in order not to unnecessarily obscure the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
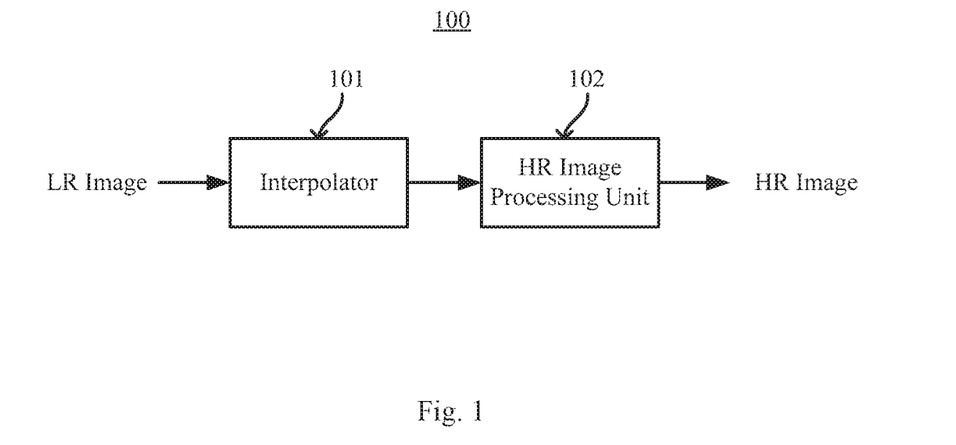
FIG. 1 is a schematic diagram illustrating a comparative Image Super-Resolution system.

FIG. 1 is a schematic diagram illustrating a comparative Image Super-Resolution system 100. The Image Super-Resolution system 100 comprises an interpolator 101 for upscaling an input low resolution (LR) image and a high resolution (HR) image processing unit 102 for processing the upscaled image. The interpolator 101 may be any type of interpolator/upsampler, performing a bicubic or bilinear interpolation operation therein to upscale the input LR image to a desired size. Then the Interpolator 101 outputs the upscaled image to the HR image processing unit 102 for a further processing. The HR image processing unit 102 may be implemented in any type of image processing system improving the image quality, such as the signal-to-noise ratio, the contrast ratio, the color performance or the sharpness, etc. After that, a high resolution image with improved image quality is output. With the development of the learning-based (or patch-based) image processing technology, it is appreciated that the convolution neural network (CNN) system is qualified for the HR image processing unit 102, due to its simple network structure and excellent reconstruction quality. In this case, the HR image processing unit 102 may comprise a plurality of convolution layers which will be further discussed below. Nevertheless, as the image processing is performed on an upscaled image, the computation complexity grows quadratically with the size of the HR image but not the original LR image. For an upscaling factor n, the computational cost of convolution with the interpolated LR image will be $n^2$ times of that for the original LR one. This is also a restriction for most learning-based SR methods. However, if the CNN network was learned directly from the original LR image, the acceleration would be significant, i.e. about $n^2$ times faster.

Figure 2:
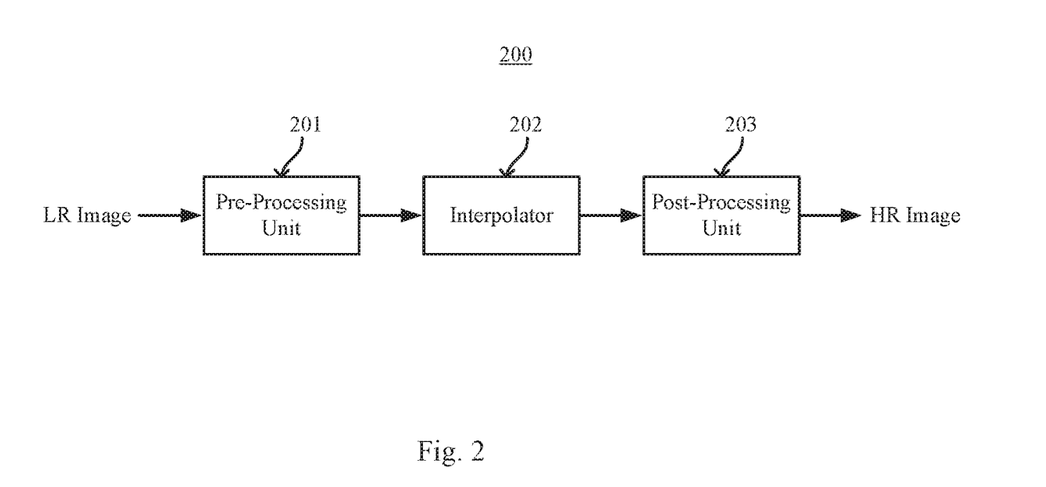
FIG. 2 is a schematic diagram illustrating an Image Super-Resolution system according to an embodiment of the disclosure.

FIG. 2 is a schematic diagram illustrating an Image Super-Resolution system 200 according to an embodiment of the disclosure. The Image Super-Resolution system 200 comprises a pre-processing unit 201 that filters the input LR image to improve the image quality. The pre-processing unit 201 functions like the HR image processing unit 102 except for the input thereto is a LR image rather than a HR image. After the pre-processing/filtering, the pre-processing unit 201 generates a LR image with improved image qualities, such as a high signal-to-noise ratio, a moderate contrast ratio, a better color performance, etc. The output of the pre-processing unit 201 is upscaled by an interpolator 202 to acquire a desired size. Then the upscaled image is further processed by a post-processing unit 203, which fine-tunes the upscaled image and outputs the final high-resolution image.

In one embodiment, the Image Super-Resolution system 200 is implemented in convolution-deconvolution neural network. In this embodiment, the pre-processing unit 201 may comprise a set of convolution layers, each of which contains a set of filters. Each of the filters may be convolved with the input LR image to improve the performance of the image features thereof. The convolution operation may be implemented in a single layer or a plurality of layers, depending on the actual demand. In general, the filtering process may be represented by:

$$F_i(Y)=f(W_i*F_{i-1}(Y)+B_i), F_0(Y)=Y \qquad (1)$$

wherein, the symbol "*" denotes the convolution operation, the notation "i", which belongs to a set (0, N), is the index of layers, and the notation "N" (no less than 0) is the number of layers in the pre-processing unit 201. Furthermore, $W_i$ and $B_i$ represent the filters and biases of the i-th layer, respectively. Here $W_i$ is of a size $n_{i-1} \times f_i \times f_i \times n_i$, where $n_i$ is the number of filters of the i-th layer, $n_0=c$ is the number of channels of the input image, $f_i$ is the spatial size of a filter. Y is the input image and f(x) denotes a non-linear function, for example, max (0, x), tan h(x), or max (0, x)+a·min(0, x).

The output of the pre-processing unit 201 is a set of feature maps, each of which is of the same size as the input LR image. Since the filtering is directly performed on the input LR image, the computational complexity of filtering is only proportional to the size of the original LR image, and the processing speed can be enhanced.

The interpolator 202 may comprise a deconvolution layer which is coupled to the last convolution layer of the pre-processing unit 201 to accept the feature maps of the pre-processing unit 201 and to generate a set of high-resolution feature maps. The deconvolution layer herein may be regarded as a general interpolation kernel and play a role of upscaling. The generated high-resolution feature maps are of the same size as the desired output high-resolution image. The operation performed by the Interpolator 202 may be represented by:

$$F_i(Y)=f(W_i \circledast F_{i-1}(Y)+B_i), i \in (N+1, N+M) \qquad (2)$$

wherein, the symbol "$\circledast$" denotes the deconvolution operation, and the notation "M" (no less than 1) is the number of layers in the interpolator 202. The other notations are similar to that described with reference to equation (1), and thus the description thereto is omitted. The output of the interpolator 202 is a set of high resolution feature maps, each of which is of the same size as the desired high-resolution image.

The set of high resolution feature maps are accepted by the post-processing unit 203 which comprises a plurality of convolution layers. The filtered and upscaled feature maps may be aggregated in the post-processing unit 203 by one or more convolution operations and constructed to a final HR image with improved image features and an enhanced image dimension. The post-processing/constructing process may be represented by:

$$F_i(Y)=f(W_i*F_{i-1}(Y)+B), i \in (N+M+1, N+M+K) \qquad (3)$$

wherein, the symbol "*" denotes the convolution operation, and the notation "K" (no less than 0) is the number of the convolution layers in the post-processing unit 203. The other notations are similar to that described with reference to equation (1), and thus the description thereto is omitted. $F_{N+H+K}(Y)$ is the final output HR image.

Figure 3:
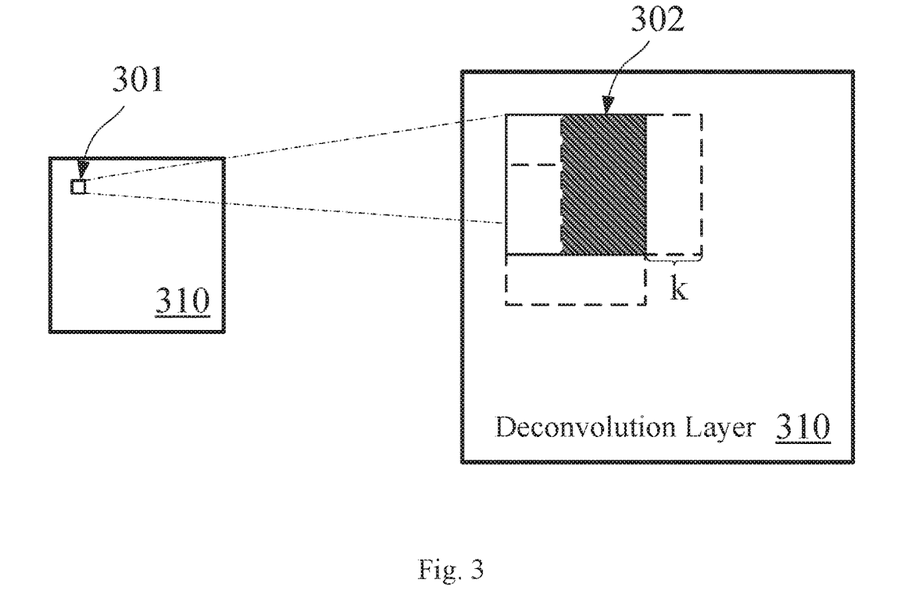
FIG. 3 is a schematic diagram illustrating an upscaling process according to an embodiment of the disclosure.
Figure 4:
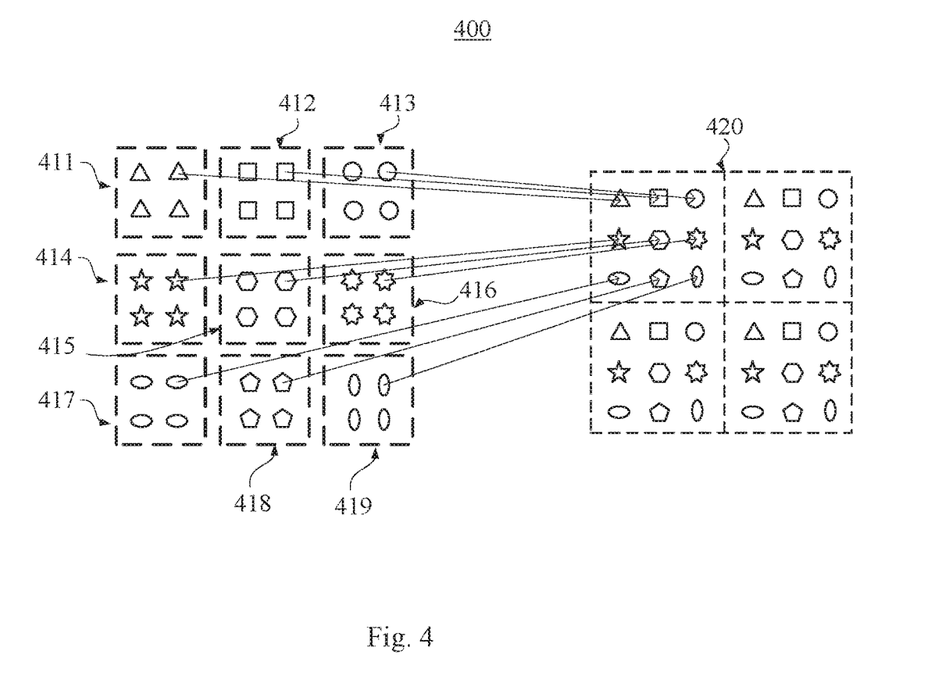
FIG. 4 is a schematic diagram illustrating an upscaling process according to another embodiment of the disclosure.

In the disclosure, two strategies for performing the upscaling in the interpolator 202 are further provided with reference to FIGS. 3 and 4. FIG. 3 is a schematic diagram illustrating an upscaling method 300 adopted by the interpolator 202 according to an embodiment of the disclosure. In this embodiment, the interpolator 202 performs a comparative deconvolution operation, which is an inverse operation of the convolution operation, to the filtered feature maps. As for convolution, if the filters are convolved with the image with a stride k, the output is 1/k times of the input. Contrarily, if the position of the input and output is exchanged, the output will be k times of the input, as depicted in FIG. 3. Specifically, each pixel of the input image is multiplied with a deconvolution filter 301 in the deconvolution layer 310, and then the results are aggregated with a stride of k. The overlapping areas 302 are averaged, for example, by certain weights. As a result, the output feature map will have a size (k−1) times larger than the input LR feature map. For the upscaling factor n, the stride k may be set as n. In an alternative implement, M deconvolution layers, each of which conducts a deconvolution operation with a stride $k_i$ (s.t., $k+ \ldots +k_M=n$), may be applied.

FIG. 4 is a schematic diagram illustrating an upscaling method 400 adopted by the interpolator 202 according to another embodiment of the disclosure. Different from the method 300, the method 400 adopts a plurality of convolution filters to mimic the function of a deconvolution filter. Specifically, n×n convolution filters are utilized for the upscaling factor n, and n×n feature maps are generated as the consequence. Then, these feature maps are aggregated with certain weights to form a large feature map that are (n−1) times larger than the input feature map. For the sake of concision, FIG. 4 only illustrates a feature map matrix consisting of 3×3 feature maps 411 to 419, each of which is convoluted out by a corresponding filter and contains a certain image feature as indicated by different shapes of symbols. After congregating, the output feature map 420 can have a feature dimension upscaled by a factor 3. That is, each feature map with a pixel density of 2×2 is upscaled to a feature map with a pixel density of (2×3)×(2×3). In an alternative implement, this step may be decomposed into M deconvolution layers, each of which upscales the feature maps with a factor $k_i$ (s.t., $k_1+ \ldots +k_M=n$).

Figure 5:
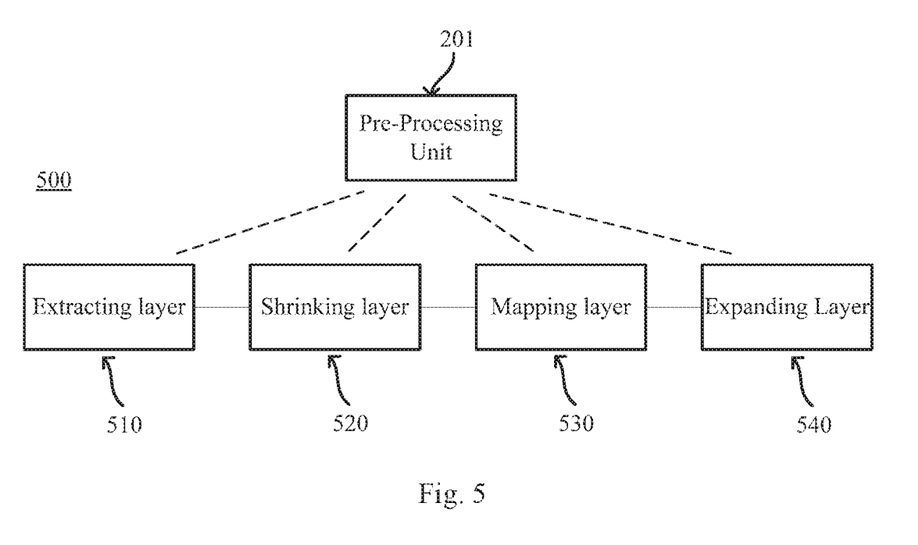
FIG. 5 is a schematic diagram illustrating the configuration of the first convolution layer according to an embodiment of the disclosure.

FIG. 5 illustrates an exemplary configuration of the pre-processing unit 201, according to an embodiment of the disclosure. In this embodiment, the pre-processing unit 201 comprises a plurality of convolution layers 510 to 540 for filtering the input LR image. The extracting layer 510 is provided with a plurality of filters for the convolution operation, in order to extract the image features of the input image. The extracting layer 510 may be implemented as a single layer or multiple layers. A shrinking layer 520 is coupled to the extracting layer 510 and reduces the feature dimension of the extracted feature map generated by the extracting layer 510. Then the feature map with reduced feature dimension is transferred to the mapping layer 530 successively coupled to the shrinking layer 520. The mapping layer 530 applies a series of non-linear calculation to the input feature map to improve the performance of the image features as described above. The mapping layer 530 may be implemented as multiple convolution layers or a single convolution layer, while each of the convolution layers may be provided with multiple filters or a single filter. Generally speaking, the mapping layer 530 will achieve a better result with more convolution layers and more filters at the cost of processing speed. An expanding layer 540 is coupled to the mapping layer 530, and acts like an inverse process of the shrinking layer 520. The shrinking operation reduces the LR feature dimension for the sake of the computational efficiency. However, if the HR image is generated directly from these low-dimensional features, the final reconstruction quality will be poor. Therefore, an expanding layer 540 is added after the mapping layer 530 to expand the HR feature dimension. Besides, the expanding layer 540 is also coupled to the interpolator 202 to transfer the filtered feature map thereto. Due to the shrinking layer 520, the calculation burden of the non-linear calculation is considerably reduced and the mapping speed is enhanced consequently. The expanding layer compensates, in an inverse process as the shrinking process, the loss in dimension, and ensures the feature performance of the output feature map.

Figure 6:
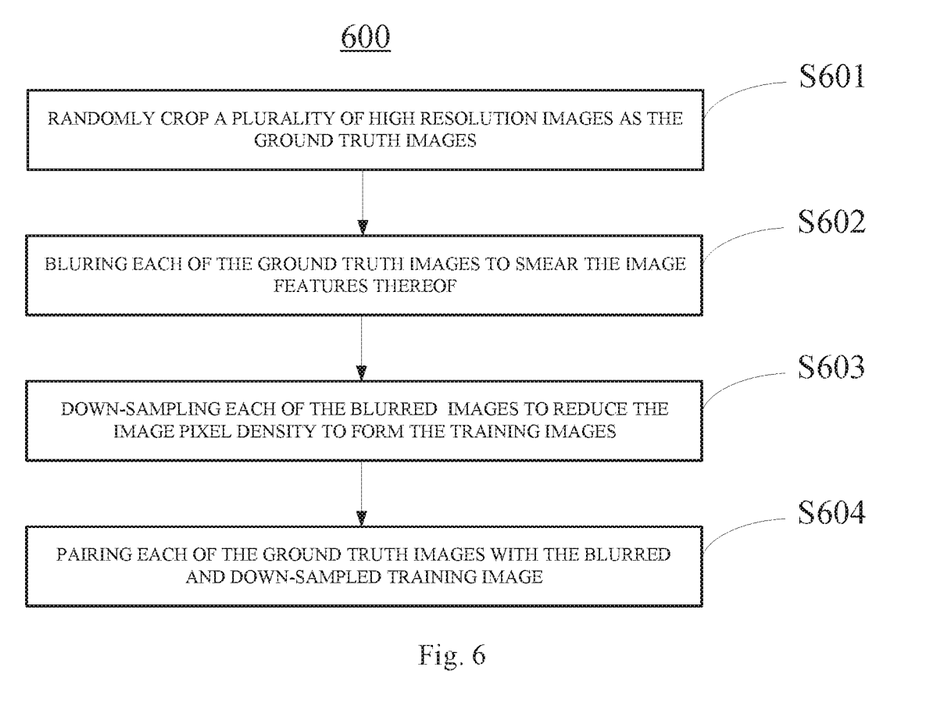
FIG. 6 is a flowchart illustrating a method for generating a training set.
Figure 7:
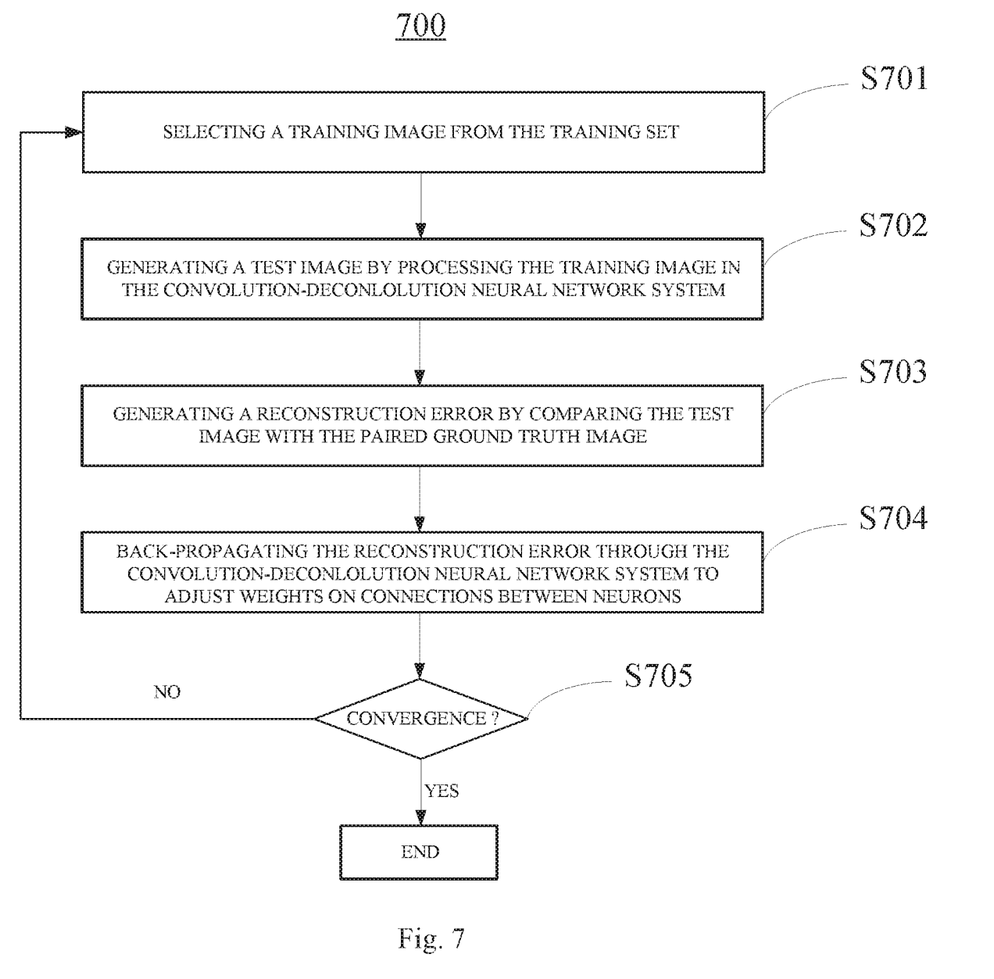
FIG. 7 is a flowchart illustrating a training process of the convolution-deconvolution neural network system according to an embodiment of the disclosure.

As previously described, the convolution-deconvolution neural network is a learning-based deep model, which needs a training process to guarantee the proper operation. FIGS. 6 and 7 illustrate such a training process. FIG. 6 illustrates the preparing process of a training set. At step S601, a plurality of high resolution images are cropped as the ground truth images. At step S602, each of the ground truth images is blurred, for example, by a Gaussian kernel. After the blurring process, the feature performance of the blurred image is deteriorated. At step S603, each of the blurred images is down-sampled to have a lowered image pixel density, which gives a set of training images. At step S604, the blurred and down-sampled training image is paired to the corresponding ground truth image, and thus a training set is formed.

FIG. 7 illustrates the principle of an exemplary training process. At step S701, a training image is randomly selected from the training set. At step S702, the selected training image is filtered, upscaled, and constructed in the convolution-deconvolution neural network as described above. As consequence, a test image with an improved feature performance and a higher resolution is acquired. At step S703, the test image is compared with the paired ground truth image, which generates a reconstruction error. At step S704, the reconstruction error is back-propagated through the convolution-deconvolution neural network to adjust weights on connections between neurons of the network. Furthermore, the reconstruction error is compared with a predetermined threshold at step S705. If the reconstruction error is lower than the predetermined threshold, the training process will be terminated, which means the convolution-deconvolution neural network has been well-trained and would properly operate for image processing. Otherwise, the process will return to step S701, and the network will be further trained. As would be appreciated by one skilled in the art, other training method is also applicable.

Figure 8:
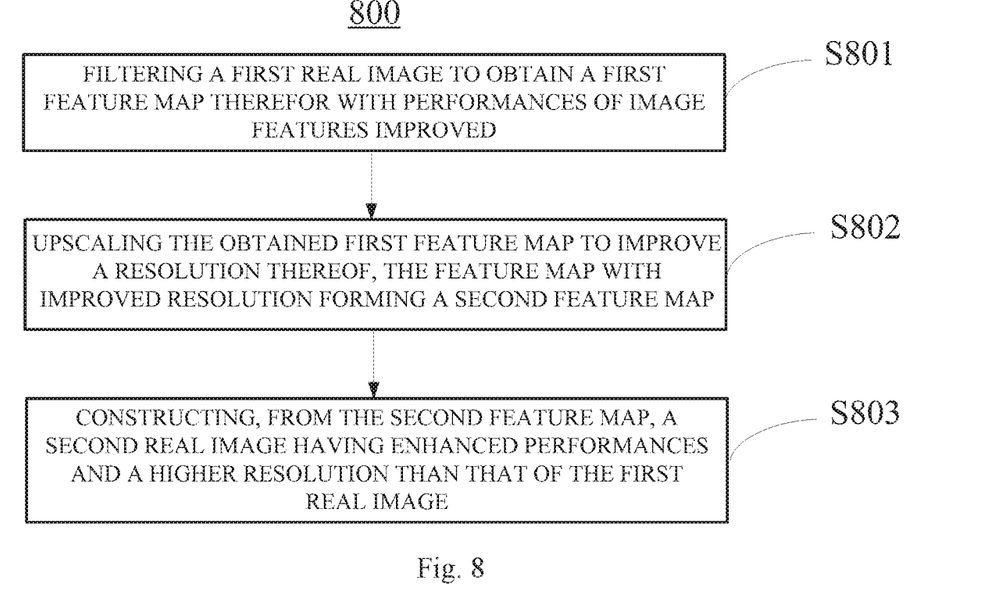
FIG. 8 is a flowchart illustrating a method for processing an image.

FIG. 8 is a flowchart illustrating a method for processing an image. The method may be embodied in form of instructions executable by a processor. At step S801, a first real image may be filtered by the processor to obtain a first feature map therefor with performances of image features improved. At step S802, the first feature map may be upscaled by the processor to improve a resolution thereof. The upscaled feature map is referred to as a second feature map. At step S803, a second real image having enhanced performances and a higher resolution than that of the first real image may be constructed from the second feature map by the processor.

Figure 9:
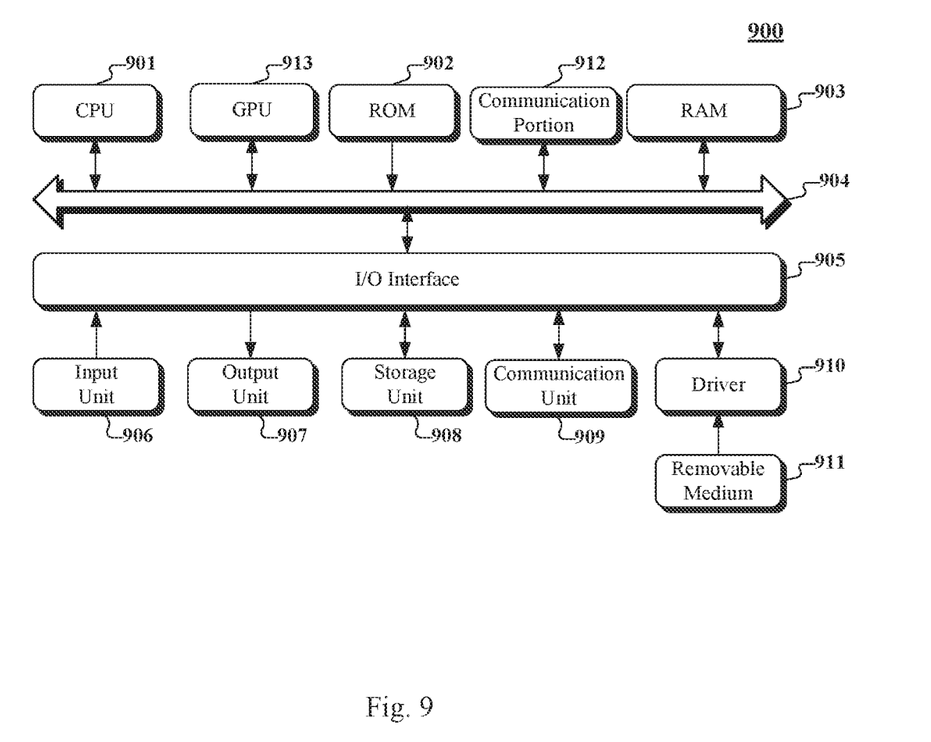
FIG. 9 is a schematic diagram illustrating a system adapted to implement the present application.

FIG. 9 is a schematic diagram illustrating a system adapted to implement the present application.

The system 900 may be a mobile terminal, a personal computer (PC), a tablet computer, a server, etc. In FIG. 9, the system 900 includes one or more processors, a communication portion, etc. The one or more processors may be: one or more central processing units (CPUs) 901 and/or one or more image processor (GPUs) 913, etc. The processor may perform various suitable actions and processes in accordance with executable instructions stored in the read-only memory (ROM) 902 or executable instructions loaded from the storage unit 908 into the random access memory (RAM) 903. The communication portion 912 may include, but is not limited to a network card. The network card may include, but is not limited to an IB (Infiniband) network card. The processor may communicate with the read-only memory 902 and/or the RAM 903 to execute the executable instructions, connect to the communication portion 912 through the bus 904 and communicate with other target devices through the communication portion 912 to complete the corresponding step in the present application. In a specific example of the present application, the steps performed by the processor includes: filtering a first real image to obtain a first feature map therefor with performances of image features improved; upscaling the obtained first feature map to improve a resolution thereof, the feature map with improved resolution forming a second feature map; and constructing, from the second feature map, a second real image having enhanced performances and a higher resolution than that of the first real image.

In addition, in the RAM 903, various programs and data required by operation of the apparatus may also be stored. The CPU 901, the ROM 902 and the RAM 903 are connected to each other through the bus 904. Where RAM 903 exists, the ROM 902 is an optional module. The RAM 903 stores executable instructions or writes executable instructions to the ROM 902 during operation, and the executable instructions cause the central processing unit 901 to perform the steps included in the image processing method of any of the embodiments of the present application. The input/output (I/O) interface 905 is also connected to the bus 904. The communication portion 912 may be integrated, and may also be provided with a plurality of sub-modules (e.g., a plurality of IB network cards) and connected to the bus 904, respectively.

The following components are connected to the I/O interface 905: an input unit 906 including a keyboard, a mouse, and the like; an output unit 907 including such as a cathode ray tube (CRT), a liquid crystal display (LCD) and a loudspeaker, and the like; a storage unit 908 including a hard disk, and the like; and a communication unit 909 including a network interface card such as a LAN card, a modem, and the like. The communication unit 909 performs communication processing via a network such as the Internet. A driver 910 also connects to the I/O interface 905 as needed. A removable medium 911, such as a magnetic disk, an optical disk, a magneto-optical disk, a semiconductor memory, is installed on the driver 910 as needed so that computer programs read therefrom are installed in the storage unit 908 as needed.

It should be noted that the architecture shown in FIG. 9 is only an alternative implementation. During the specific practice process, the number and types of parts as shown in FIG. 9 may be selected, deleted, added or replaced according to actual needs. Upon setting different functional parts, implementations such as separate setting or integrated setting may also be adopted, for example, the GPU and the CPU may be set separately, and again for the same reason, the GPU may be integrated on the CPU, the communication portion may be set separately, and may also be set integrally on the CPU or GPU. These alternative implementations all fall within the protection scope of the present application.

In particular, according to the embodiments of the present application, the process described above with reference to the flowchart may be implemented as a computer software program, for example, the embodiments of the present application include a computer program product, which includes a computer program tangible included in a machine-readable medium. The computer program includes a program code for performing the steps shown in the flowchart. The program code may include corresponding instructions to perform correspondingly the steps in the image processing method provided by any of the embodiments of the present application, including: filtering a first real image to obtain a first feature map therefor with performances of image features improved; upscaling the obtained first feature map to improve a resolution thereof, the feature map with improved resolution forming a second feature map; and constructing, from the second feature map, a second real image having enhanced performances and a higher resolution than that of the first real image.

In such embodiments, the computer program may be downloaded and installed from the network through the communication unit 909, and/or installed from the removable medium 911. When the computer program is executed by the central processing unit (CPU) 901, the above-described instruction described in the present application is executed.

As will be appreciated by one skilled in the art, the disclosure may be embodied as a system, a method or a computer program product. Accordingly, the disclosure may take the form of an entirely hardware embodiment and hardware aspects that may all generally be referred to herein as a "unit", "circuit," "module" or "system." Much of the inventive functionality and many of the inventive principles when implemented, are best supported with or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the disclosure, further discussion of such software and ICs, if any, will be limited to the essentials with respect to the principles and concepts used by the preferred embodiments. In addition, the present invention may take the form of an entirely software embodiment (including firmware, resident software, micro-code, etc.) or an embodiment combining software. For example, the system may comprise a memory that stores executable components and a processor, electrically coupled to the memory to execute the executable components to perform operations of the system, as discussed in reference to FIGS. 1-6. Furthermore, the present invention may take the form of a computer program product embodied in any tangible medium of expression having computer-usable program code embodied in the medium.

Although the preferred examples of the disclosure have been described, those skilled in the art can make variations or modifications to these examples upon knowing the basic inventive concept. The appended claims are intended to be considered as comprising the preferred examples and all the variations or modifications fell into the scope of the disclosure.

Obviously, those skilled in the art can make variations or modifications to the disclosure without departing the spirit and scope of the disclosure. As such, if these variations or modifications belong to the scope of the claims and equivalent technique, they may also fall into the scope of the disclosure.

What is claimed is:

1. A method for processing an image, wherein the method is implemented in a convolution-deconvolution neural network, the convolution-deconvolution neural network comprising a first convolution layer, a second convolution layer, and a deconvolution layer coupled to the first convolution layer and the second convolution layer, and the method comprises:

filtering by the first convolution layer a first real image to obtain a first feature map therefor with performance of image features improved, wherein the first convolution layer comprises:

an extracting layer extracting the image feature of the first real image,         a shrinking layer coupled to the extracting layer and reducing the feature dimension of the extracted feature,         a mapping layer coupled to the shrinking layer and non-linearly mapping the extracted feature with the reduced feature dimension, and         an expanding layer coupling the mapping layer with the deconvolution layer and expanding the feature dimension of the mapped feature to obtain the first feature map;

upscaling by the deconvolution layer the obtained first feature map to improve a resolution thereof, the feature map with improved resolution forming a second feature map; and     constructing, by the second convolution layer from the second feature map, a second real image having enhanced performances and a higher resolution than that of the first real image.

2. The method of claim 1, further comprising:

training the convolution-deconvolution neural network by:

filtering, by the first convolution layer, the first image to improve the performances of the image features therefor;

upscaling, by the deconvolution layer, the filtered image to improve the resolution thereof;

aggregating, by the second convolution layer, the upscaled image to construct a test image;

comparing the test image with an image selected from ground truth images, which is paired to the training image selected from a predetermined training set, to obtain a reconstruction error therebetween; and     back-propagating iteratively the reconstruction error through the network to adjust weights on connections between neurons of the network until the reconstruction error is lower than a predetermined threshold.

3. The method of claim 2, wherein the training set is prepared by:

blurring each of the ground truth images to cause the image features thereof to be smeared;

down-sampling each of the blurred ground truth images to obtain a blurred and down-sampled training image with blurred image features and a reduced pixel density; and     pairing each of the ground truth images with the blurred and down-sampled training image.

4. The method of claim 1, wherein the upscaling is performed by a deconvolution operation.

5. The method of claim 1, wherein the upscaling is performed by a plurality of convolution filters to mimic a function of a deconvolution filter for upscaling the first feature map to obtain the second feature map.

6. A system for processing an image, comprising:

a processor; and a memory storing instructions executable by the processor to perform operations using a convolution-deconvolution neural network, the convolution-deconvolution neural network comprising a first convolution layer, a second convolution layer, and a deconvolution layer coupled to the first convolution layer and the second convolution layer, and the operations comprising:

filtering by the first convolution layer a first real image to obtain a first feature map therefor with performance of image features improved, wherein the first convolution layer comprises:

an extracting layer extracting the image feature of the first real image,         a shrinking layer coupled to the extracting layer and reducing the feature dimension of the extracted feature,         a mapping layer coupled to the shrinking layer and non-linearly mapping the extracted feature with the reduced feature dimension, and         an expanding layer coupling the mapping layer with the deconvolution layer and expanding the feature dimension of the mapped feature to obtain the first feature map;

upscaling by the deconvolution layer the obtained first feature map to improve a resolution thereof, the feature map with improved resolution forming a second feature map; and     constructing, by the second convolution layer from the second feature map, a second real image having enhanced performances and a higher resolution than that of the first real image.

7. The system of claim 6, wherein the convolution-deconvolution neural network is trained by:

filtering, by the first convolution layer of the neural network, the first image to improve the performances of the image features therefor;

upscaling, by the deconvolution layer of the neural network, the filtered image to improve the resolution thereof;

aggregating, by the second convolution layer of the neural network, the upscaled image to construct a test image;

comparing, the test image with an image selected from ground truth images, which is paired to a training image selected from a predetermined training set, to obtain a reconstruction error therebetween; and     back-propagating iteratively the reconstruction error through the network to adjust weights on connections between neurons of the network until the error is lower than a predetermined threshold.

8. The system of claim 7, wherein the training set is prepared by blurring each of the ground truth images to cause the image features thereof to be smeared;

down-sampling each of the blurred ground truth images to obtain a blurred and down-sampled training image with blurred image features and a reduced pixel density; and     pairing each of the ground truth images with the blurred and down-sampled training image.

9. The system of claim 6, wherein the upscaling is performed by a deconvolution operation.

10. The system of claim 6, wherein the upscaling is performed by a plurality of convolution filters to mimic a function of a deconvolution filter for upscaling the first feature map to obtain the second feature map.

11. A non-transitory computer readable storage medium for storing computer readable instructions executable by a processor to perform operations using a convolution-deconvolution neural network, the convolution-deconvolution neural network comprising a first convolution layer, a second convolution layer, and a deconvolution layer coupled to the first convolution layer and the second convolution layer, and the operations comprising:
  filtering by the first convolution layer a first real image to obtain a first feature map therefor with performance of image features improved, wherein the first convolution layer comprises:
    an extracting layer extracting the image feature of the first real image,
    a shrinking layer coupled to the extracting layer and reducing the feature dimension of the extracted feature,
    a mapping layer coupled to the shrinking layer and non-linearly mapping the extracted feature with the reduced feature dimension, and
    an expanding layer coupling the mapping layer with the deconvolution layer and expanding the feature dimension of the mapped feature to obtain the first feature map;
  upscaling by the deconvolution layer the obtained first feature map to improve a resolution thereof, the feature map with improved resolution forming a second feature map; and
  constructing, by the second convolution layer from the second feature map, a second real image having enhanced performances and a higher resolution than that of the first real image.

12. The non-transitory computer readable storage medium of claim 11, wherein the operations further comprise:
  training the convolution-deconvolution neural network by:
    filtering, by the first convolution layer, the first real image to improve the performances of the image features therefor;
    upscaling, by the deconvolution layer, the filtered image to improve the resolution thereof;
    aggregating, by the second convolution layer, the upscaled image to construct a test image;
    comparing the test image with an image selected from ground truth images, which is paired to a training image selected from a predetermined training set, to obtain a reconstruction error therebetween; and
    back-propagating iteratively the reconstruction error through the network to adjust weights on connections between neurons of the network until the error is lower than a predetermined threshold.

13. The non-transitory computer readable storage medium of claim 12, wherein the training set is prepared by:
  blurring each of the ground truth images to cause the image features thereof to be smeared;
  down-sampling each of the blurred ground truth images to obtain a blurred and down-sampled training image with blurred image features and a reduced pixel density; and
  pairing each of the ground truth images with the blurred and down-sampled training image.

14. The non-transitory computer readable storage medium of claim 11, wherein the upscaling is performed by a deconvolution operation.

* * * * *